Nov. 18, 1924.                                    1,515,740
W. W. LAIDLEY
RAKE
Filed Nov. 8, 1923

INVENTOR
William W. Laidley
BY
M. C. Frank
ATTORNEY

Patented Nov. 18, 1924.

1,515,740

UNITED STATES PATENT OFFICE.

WILLIAM W. LAIDLEY, OF PIEDMONT, CALIFORNIA.

RAKE.

Application filed November 8, 1923. Serial No. 673,512.

*To all whom it may concern:*

Be it known that I, WILLIAM W. LAIDLEY, a citizen of the United States, residing at Piedmont, in the county of Alameda and State of California, have invented certain new and useful Improvements in Rakes, of which the following is a specification.

This invention relates to rakes and in particular to lawn rakes, and consists primarily of a device for use in the garden for the purpose of clearing the lawn of objects such as cut grass, leaves and other refuse that generally collects thereon.

A major object is to construct this rake as light as possible and still maintain the proper weight for convenient balance and flexure in operation, to overcome the tiresome wrist strain experienced in using the present rakes. It is to be understood that in constructing a rake of this character, that I have experimented a great deal with different materials and methods of construction and have finally produced a tool constructed in accordance with my invention designed to keep the cost of production to a minimum without sacrificing strength or durability.

Another object of the invention is to construct a device which may be readily produced from stock material, such for instance, as metallic fencing of open mesh design. The stock used being preferably steel wire of suitable resiliency and strength.

Other objects and advantages and the features of construction of the invention, will appear in the subjoined description of the accompanying sheet of drawings, in which.

Figure 1:
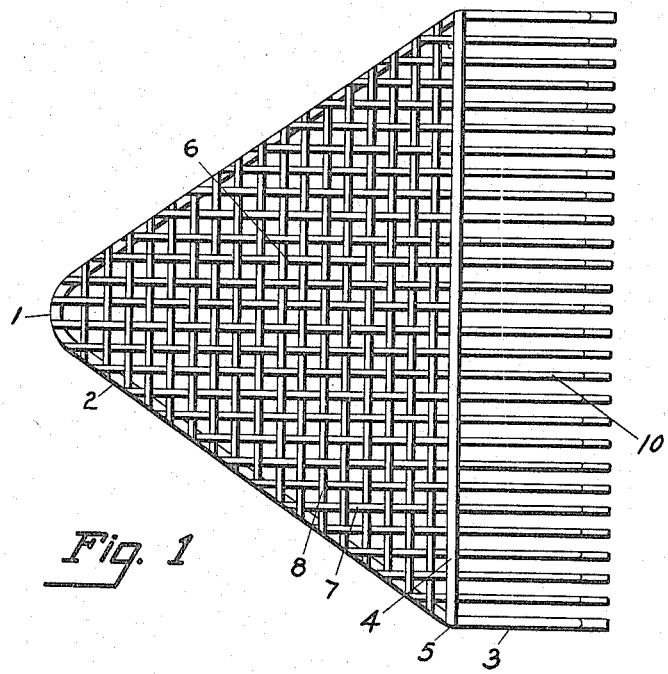
Figure 1 is a plan of a rake constructed in accordance with the principles of my invention, the handle being omitted therefrom for convenience of illustration.

Referring to the drawing and figures thereof: The frame of the rake (Fig. 1) is preferably constructed in the form of a triangle, and consists of a suitable wire rod bent V-shaped as at 1 to form the sides 2, the terminals of which being also bent to form the end tines 3. A tie or cross-rod 4 forms the base of the triangle, and is "spot welded" or otherwise secured to the sides 2 as at 5 to complete the frame.

The body 6 of the rake is of open wire mesh material and is preferably of commercial fencing carried in stock, the wire thereof being of lighter gage than the frame. Said body 6 is composed of wires interwoven at right angles to each other, and form a series of longitudinal wires 7 and transverse wires 8.

In the construction of the body of my rake, I prefer to cut stock wire fencing of the character mentioned to a pattern of V-shaped form, similar to the outline of the frame, and remove certain transverse strands from the base portion of the body, then insert the angular part of the body through the frame and register the same thereon and have the longitudinal extending wires 7 under the cross-rod 4 as shown clearly in Fig. 1. And with the body so registered upon the frame, all of the contacting wires thereon or as many as desired, may be "spot welded" thereto, including the longitudinal wires contacting the under-side of the cross-rod 4, thereby, the whole forms a unit which has the desired rigidity transversely thereof, and a certain desired longitudinal resiliency for flexure in service, which lessens fatigue in raking to a very marked extent.

The size of the mesh selected determines the number of tines to the rake, and owing to the interwoven construction of the fabric the tines will always be properly spaced apart and held in a rigid position, and thus will not become loose and turn in service which is common to certain rakes on the market that I am familiar with.

Figure 2:
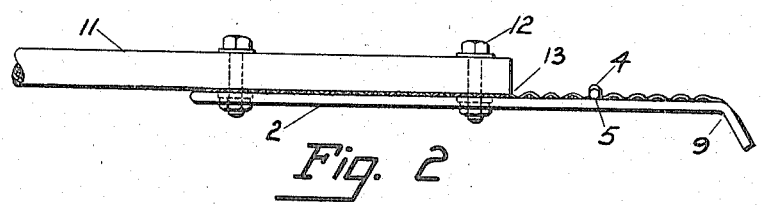
Fig. 2 is a side elevation or edge view of Fig. 1, and shows a portion of a handle attached to the rake.

The longitudinally extending wires 7 have their free end turned downwardly at substantially an obtuse angle, as indicated at 9 Fig. 2 to form the tines 10 of the rake.

An ordinary handle 11 may be secured to the rake-head in any well-known manner, such for example as by means of the bolts 12 inserted through any mesh-opening desired. The latter feature is of importance, as the length of handle on the rake body determines the degree of flexure in the use of the rake. The rake flexes up to the end 13 of the handle.

Figure 5:
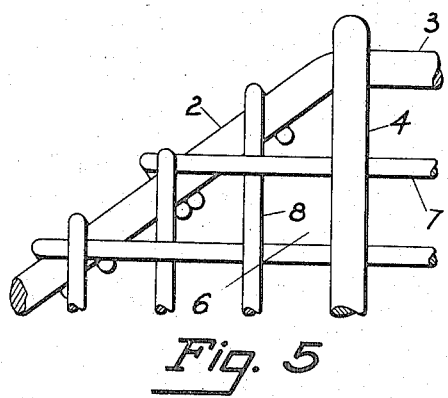
Fig. 5 is a modified and enlarged fragmentary plan showing the wire ends bent around the frame.
Figure 3:
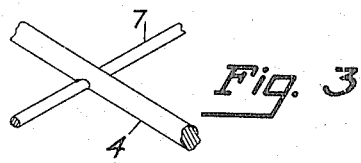
Fig. 3 is a fragmentary perspective view of a wire crossing.
Figure 4:
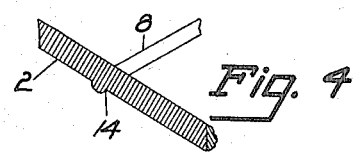
Fig. 4 is a similar view partly in section to show the union of the wires, the result of "spot welding."
Figure 6:
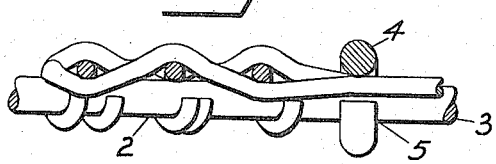
Fig. 6 is an elevation of Fig. 5 and shows to advantage the lacing of the wires of the fabric.

Fig. 3 shows a longitudinal wire 7 welded to the cross-rod 4, and in Fig. 4 I have shown a sectional detail of a portion of the side 2 of the frame, and a portion of one of the transverse wires 8 "spot welded" as indicated at 14. This shows how the metal fuses. This means of fastening is my preferred way as it simplifies manufacture and reduces the cost to a minimum. However, I do not wish to limit myself to this construction and have therefore shown a modified form in Figs. 5 and 6.

In said figures the rod 4, longitudinal wires 7 and transverse wires 8 have their ends bent around and under the frame as clearly shown. This may be done with pliers or a like tool, and is considered practical by applicant if this construction is desired.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made, when desired, as fall within the scope of the appended claims.

Having thus described my invention, what I claim as new and desire to secure by Letters Patent of the United States, is the following:

1. A rake comprising a wire frame, a wire fabric superposed and covering said frame, and means of attaching said fabric to said frame; the tines of said rake being formed as a part of the fabric.

2. A rake comprising a wire frame, a fabric superposed and covering said frame and consisting of transverse and longitudinal wires, and means of fastening the ends of said wires to said frame; the said longitudinal wires having tines formed at the free ends thereof.

3. A rake comprising a triangular wire frame and a body of interwoven wire fabric superposed and secured thereto to form a bracing medium therefor; the said fabric consisting of transverse and longitudinal wires, the latter wires extending outwardly and downwardly from said frame to form the tines of the rake.

4. A rake comprising a rod bent V-shaped and a cross-rod connected thereto near its outer ends to form a frame, a wire fabric secured to the frame consisting of longitudinal and transverse wires, and the said longitudinal wires extending under said cross-rod and outwardly therefrom to form a series of tines.

In testimony whereof I affix my signature.

WILLIAM W. LAIDLEY.